(12) United States Patent
Symons

(10) Patent No.: US 8,432,293 B2
(45) Date of Patent: Apr. 30, 2013

(54) CHARGING A CHARGEABLE POWER SUPPLY OF A NEAR FIELD COMMUNICATION (NFC) ENABLED DEVICE FROM A RADIO FREQUENCY (RF) SIGNAL INDUCTIVELY COUPLED ONTO A MAGNETIC FIELD

(75) Inventor: Peter Robert Symons, Wokingham (GB)

(73) Assignee: Innovision Research & Technology PLC, Gloucestershire (GB)

( * ) Notice: Subject to any disclaimer, the term of this patent is extended or adjusted under 35 U.S.C. 154(b) by 1056 days.

(21) Appl. No.: 11/795,434

(22) PCT Filed: Jan. 19, 2006

(86) PCT No.: PCT/GB2006/000195
§ 371 (c)(1),
(2), (4) Date: Jul. 17, 2007

(87) PCT Pub. No.: WO2006/077418
PCT Pub. Date: Jul. 27, 2006

(65) Prior Publication Data
US 2008/0272889 A1      Nov. 6, 2008

(30) Foreign Application Priority Data
Jan. 19, 2005  (GB) .................................. 0501115.0

(51) Int. Cl.
*G08B 1/08* (2006.01)
*G08C 19/02* (2006.01)
*B60Q 1/00* (2006.01)
*H04B 5/00* (2006.01)
*H04B 1/38* (2006.01)
*H02J 7/00* (2006.01)

(52) U.S. Cl.
USPC ............... 340/854.8; 340/538.16; 340/12.38; 340/455; 340/636.2; 340/572.1; 455/41.1; 455/41.2; 455/572; 455/573; 455/343.2; 320/108; 320/106; 320/138

(58) Field of Classification Search .................. None
See application file for complete search history.

(56) References Cited

U.S. PATENT DOCUMENTS
5,287,112 A * 2/1994 Schuermann ................... 342/42
5,815,355 A   9/1998 Dawes
(Continued)

FOREIGN PATENT DOCUMENTS
WO    WO 01/07413 A1     9/2001
WO    WO 2005/057481 A1  6/2005

OTHER PUBLICATIONS
International Search Report for Patent Application No. PCT/GB2006/000195, dated Apr. 6, 2006, 3 pages.
(Continued)

*Primary Examiner* — Jennifer Mehmood
*Assistant Examiner* — Fekadeselassie Girma
(74) *Attorney, Agent, or Firm* — Sterne, Kessler, Goldstein & Fox P.L.L.C.

(57) ABSTRACT

A NFC communicator or NFC communications enabled device (1 or 2 or 100*a*) has a data store (108) to store data, a coupler (17 or 32 or 102) to couple inductively with the magnetic field of a radio frequency signal and a signal generator (109) to supply a radio frequency signal to the coupler. A modulator (110) is provided to modulate a radio frequency signal in accordance with data and a demodulator (114) is provided to extract data from a modulated radio frequency signal inductively coupled to the coupler. A controller (107) enables the NFC communicator or NFC communications enabled device both to initiate near field radio frequency communication with another near field RF communicator and to respond to near field radio frequency communication initiated by another near field RF communicator. The NFC communicator or NFC communications enabled device also has a power deliver (19 or 34 or 103) that derives power from a radio frequency signal inductively coupled to the coupler to charge a chargeable power supply.

25 Claims, 9 Drawing Sheets

U.S. PATENT DOCUMENTS

| | | | |
|---|---|---|---|
| 5,982,647 A | 11/1999 | Martin et al. | |
| 6,003,777 A | 12/1999 | Kowalski | |
| 6,173,899 B1 | 1/2001 | Rozin | |
| 6,184,651 B1* | 2/2001 | Fernandez et al. | 320/108 |
| 6,342,844 B1* | 1/2002 | Rozin | 340/933 |
| 6,731,198 B1 | 5/2004 | Stobbe et al. | |
| 6,909,876 B2* | 6/2005 | Higashino et al. | 455/41.2 |
| 7,098,770 B2 | 8/2006 | Charrat et al. | |
| 7,233,247 B1* | 6/2007 | Crossno et al. | 340/572.1 |
| 7,373,133 B2* | 5/2008 | Mickle et al. | 455/343.1 |
| 7,375,616 B2* | 5/2008 | Rowse et al. | 340/10.1 |
| 7,665,664 B2 | 2/2010 | Charrat et al. | |
| 2002/0138199 A1* | 9/2002 | Brodie | 701/213 |
| 2004/0099738 A1* | 5/2004 | Waters | 235/451 |
| 2004/0145342 A1* | 7/2004 | Lyon | 320/108 |
| 2005/0030160 A1* | 2/2005 | Goren et al. | 340/10.5 |
| 2005/0109841 A1* | 5/2005 | Ryan et al. | 235/380 |
| 2005/0127867 A1* | 6/2005 | Calhoon et al. | 320/108 |
| 2005/0127868 A1* | 6/2005 | Calhoon et al. | 320/108 |
| 2006/0063568 A1* | 3/2006 | Mickle et al. | 455/572 |
| 2006/0103533 A1* | 5/2006 | Pahlavan et al. | 340/572.1 |
| 2007/0018832 A1* | 1/2007 | Beigel et al. | 340/572.7 |
| 2007/0045418 A1 | 3/2007 | Charrat et al. | |
| 2007/0178936 A1* | 8/2007 | Chiang | 455/557 |
| 2008/0018466 A1* | 1/2008 | Batra et al. | 340/572.1 |

OTHER PUBLICATIONS

International Preliminary Report on Patentability for Patent Application No. PCT/GB2006/000195, dated Jul. 24, 2007, 7 pages.

* cited by examiner

CHARGING A CHARGEABLE POWER SUPPLY OF A NEAR FIELD COMMUNICATION (NFC) ENABLED DEVICE FROM A RADIO FREQUENCY (RF) SIGNAL INDUCTIVELY COUPLED ONTO A MAGNETIC FIELD

FIELD OF DISCLOSURE

This invention relates to NFC communicators and devices comprising NFC communicators.

BACKGROUND

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimetres (generally a maximum of 1 metre) are common for near field RF communicators.

Near field communication may be referred to as near-field RFID (Radio Frequency Identification) or near-field communication. NFC communicators are a type of near field RF communicator that is capable of both initiating a near field RF communication (through transmission or generation of an alternating magnetic field) with another near field RF communicator and of responding to initiation of a near field RF communication by another near field RF communicator. The term "near field RF communicator" includes not only NFC communicators but also initiating near field RF communicators such as RFID transceivers or readers that are capable of initiating a near field RF communication but not responding to initiation of a near field RF communication by another near field RF communicator and responding near field RF communicators such as RFID transponders or tags that are capable of responding to initiation of a near field RF communication by another near field RF communicator but not of initiating a near field RF communication with another near field RF communicator. Hence NFC communicators can act as both RFID transceivers and RFID transponders and are able to communicate with other NFC communicators, RFID transceivers and RFID transponders.

Examples of near field RF communicators are defined in various standards for example ISO/IEC 18092, ISO/IEC 14443, ISO/IEC 15693 ISO/IEC 21481.

NFC communicators may be provided as standalone or discrete devices or may be incorporated within or coupled to larger electrical devices or host devices (referred to below as NFC communications enabled devices) to enable those devices to communicate by the near field with other near field RF communicators or devices incorporating or coupled to such near field RF communicators. When incorporated within a larger device or host, a NFC communicator may be a discrete entity or may be provided by functionality within the larger device or host. Examples of such larger devices or host devices are, for example, mobile telephones, portable computing devices (such as personal digital assistants, notebooks, lap-tops), other computing devices such as personal or desk top computers, computer peripherals such as printers, or other electrical devices such as portable audio and/or video players such as MP3 players, IPODs®, CD players, DVD players.

NFC communicators and host devices of course require a power supply to function. Where an NFC communicator or host device incorporating or coupled to an NFC communicator is powered by a chargeable power supply such as a rechargeable battery, then maintenance of a sufficient power supply is of prime importance to the functioning of both the host device and the NFC communicator, particularly where the NFC communicator or host device is being used in circumstances in which charging of the battery using a mains charging unit is not possible, for example because the user of the NFC communicator or host device does not have the mains recharging unit with them or is in a location without access to a mains power supply point. These power supply issues may be exacerbated for a host device because the NFC communicator may place an additional drain on the chargeable power supply of the host device. Additionally absence of suitable power supply may prevent or interrupt near field RF communication between one NFC communicator and another near field RF communicator. Depending on the application of such communication this could result in a failure to complete a required function or action, for example, a failure to obtain access to a location, refusal of a ticket to travel, inability to purchase goods or transfer data or information between electrical devices.

BRIEF SUMMARY

In one aspect, the present invention provides an NFC communicator or an NFC communications enabled device such as an a host device incorporating NFC functionality (either by way of a discrete NFC communicator incorporated within or coupled or attached to the host device or by way of NFC functionality provided as part of, for example integrated with, the other functionality of the host device) which has or is associated with a chargeable power supply and has a power deriver which is operable to charge the chargeable power supply from an RF signal inductively coupled to the NFC communications enabled device or NFC communicator when the NFC communications enabled device or NFC communicator is in the near field of that RF signal. The RF signal may be provided by another NFC communicator or NFC communications enabled device or other near field RF communicator such as an RFID reader or an RFID tag, if the RFID tag can provide sufficient power.

An NFC communications enabled device or NFC communicator embodying the invention may thus charge a chargeable power supply by near field RF communication and/or enable another near field RF communicator or communications enabled device embodying the invention to charge its chargeable power supply by near field RF communication, thereby enabling the NFC communications enabled device or NFC communicator to function even in circumstances where the chargeable power supply or one of a number of available power supplies has been drained or has only a small amount of power available and the user is not able to access a mains power supply to charge up the chargeable power supply. The received power may be used for some or all of the NFC communicator functionality and/or any host device functionality.

BRIEF DESCRIPTION OF THE DRAWINGS/FIGURES

Embodiments of the present invention will now be described, by way of example, with reference to the accompanying drawings, in which.

DETAILED DESCRIPTION

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The NFC communicator may be provided wholly or partially as an integrated circuit or collections of integrated circuits.

Figure 1:
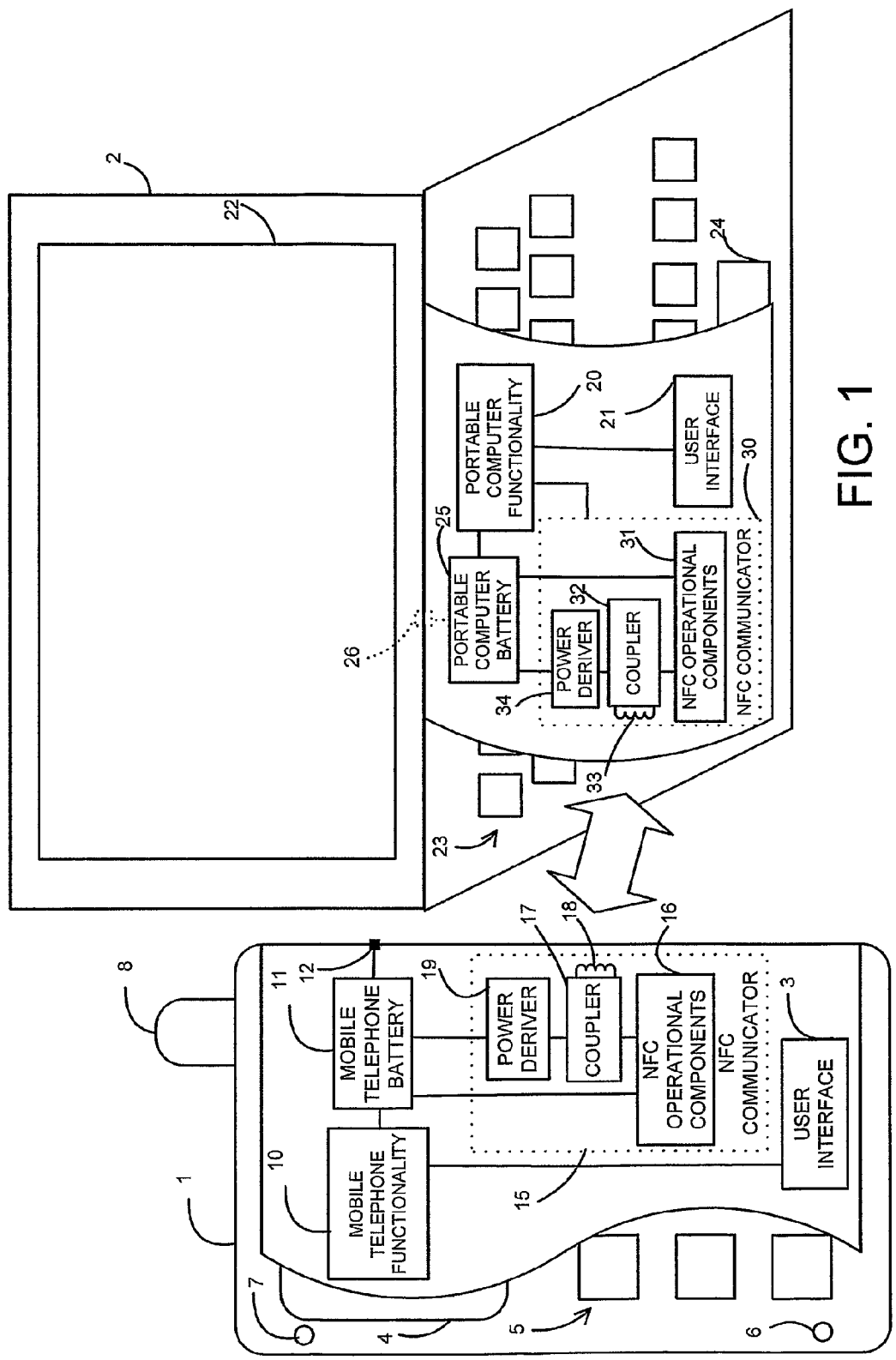
FIG. 1 shows a representational diagram illustrating use of one NFC communications enabled device to charge a chargeable power supply of another NFC communications enabled device.

Referring now specifically to FIG. 1, there is shown a representational diagram illustrating use of one NFC communications enabled device to charge a chargeable power supply of another NFC communications enabled device. In FIG. 1 the representations of the NFC communications enabled devices have been show partly cut-away and the functionality provided by the NFC communications enabled devices illustrated by way of a functional block diagram within the NFC communications enabled device.

As shown in FIG. 1, one NFC communications enabled device comprises a mobile telephone (cellphone) 1 and the other NFC communications enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 18 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25.

In addition, as shown in FIG. 1, the NFC communications enabled devices 1 and 2 have an NFC communicator 15 and 30, respectively. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31, respectively, for, as will be described below, enabling control of the NFC functionality and generation, modulation and demodulation of an RF signal. Each NFC communicator 15 and 30 also comprises a coupler 17 and 32, respectively, comprising an inductor or coil in the form of a respective antenna 18 and 33. The couplers 17 and 32 enable an alternating magnetic field (H field) generated by the antenna of one near field communicator 15 (or 30) by transmission of an RF signal (for example a 13.56 Mega Hertz signal) to be inductively coupled to the antenna of the other near field communicator 30 (or 15) when that antenna is within the near field of the RF signal generated by the one near field communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 11 or 20, respectively. In, addition, each of the NFC communicators 15 and 30 is coupled to their respective batteries 11 and 25 of their respective host devices 1 and 2 so that each NFC communicator is powered by the chargeable power supply of its host device. Alternatively or additionally, the NFC communicators 15 and 30 may be connected to their own chargeable power supplies (not shown).

Each NFC communicator 15 and 30 also comprises a power deriver 19 and 34 respectively, coupled between their respective couplers 17 and 32 and their respective batteries 11 and 25 for, when the coupler 17 or 32 is in the near field range of an antenna transmitting an RF signal, charging the battery 11 or 25 using a charging current or voltage derived from the inductive coupling to the coupler 17 or 32 of the alternating magnetic field (H field) generated by that RF signal. Additionally or alternatively the power deriver 19 and 34 may be coupled to additional power supplies within the host device or specific to the NFC communicators 15 and 30, for example a button cell battery, other small battery or capacitor.

Charging of a chargeable power supply of an NFC communications enabled device may, for example, be initiated in response to user input to the user interface (3 or 21 in FIG. 1) of the NFC communications enabled device that requires charging. For example, when a user discovers that their NFC communications enabled device is low on power, then the user can bring that NFC communications enabled device into the near field range of another NFC communications enabled device that is not low on power to enable the power deriver to charge up the chargeable power supply. Thus in the scenario shown in FIG. 1, if a user discovers that their NFC communications enabled mobile telephone 1 is so low on power that they cannot make a call and they are without their mobile telephone charging unit or have no access to a mains power outlet, they can use their NFC communications enabled portable computer 2 to charge up the mobile telephone battery. Conversely, if the user discovers that their NFC communications enabled portable computer 2 is low on power and they are without their portable computer charging unit or have no access to a mains power outlet, they can use their NFC communications enabled mobile telephone 1 to charge up the portable computer battery.

As another possibility, charging may occur automatically when an NFC communications enabled device with a battery which is not fully charged is in the near field of a suitable RF signal. For example, when the battery is low, the NFC communicator 15 may be operable to couple to any near field RF signal and through the power deriver 19, derive power from that near field RF signal.

As another possibility, charging may occur under the control of at least one of the host device functionality and the NFC operational components of at least one of the NFC communications enabled device being charged and the NFC communications enabled device providing the charge. As an example, the NFC operational components (16 or 31) of the NFC communications enabled device to be charged (1 or 2) may allow charging to occur only when that RF signal is not being used to communicate control or other data or when specific permission has been received from the NFC communications enabled device providing the RF signal from which charge is to be derived so that one user may not, without authorization, charge their NFC communications enabled device using somebody else's NFC communications enabled device. Users with multiple NFC communications enabled devices may also be able to set those devices such that charging is automatic when one device begins to get low on battery, for example in FIG. 1 settings on the portable computer 2 may be set by the user to provide power to the mobile telephone 1 whenever the mobile telephone battery requires charging.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device.

Also, rather than being incorporated within the host device, the NFC communicator 15 or 30 may be associated with the host device, for example by a wired or wireless coupling that is capable of power transfer. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or an other device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
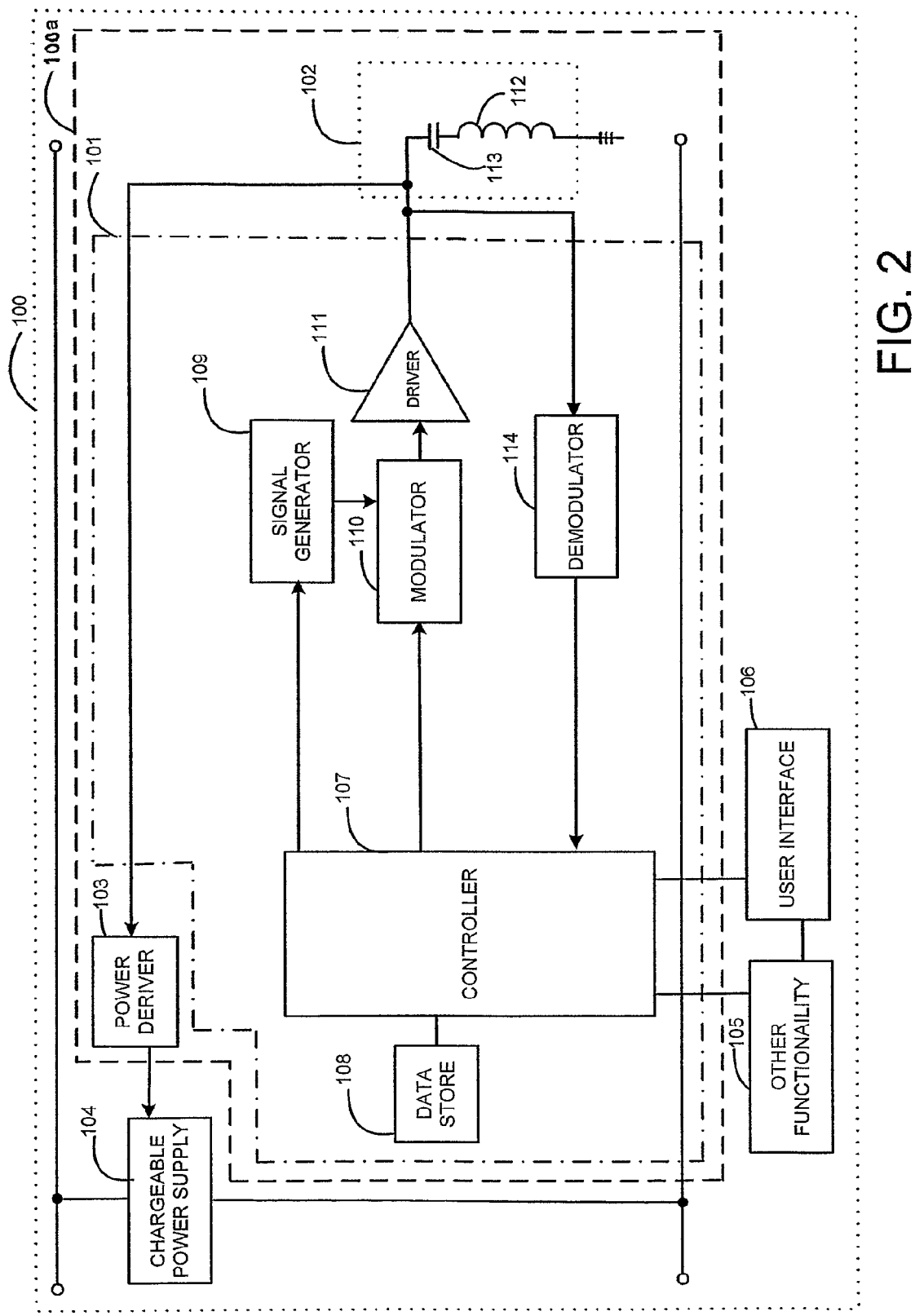
FIG. 2 shows a functional block diagram of an NFC communications enabled device.

FIG. 2 shows a functional block diagram of an NFC communications enabled device 100 in accordance with the invention to illustrate in greater detail one way in which the NFC operational components of an NFC communications enabled device embodying the invention may be implemented.

In this example, the NFC communications enabled device 100 comprises an NFC communicator 100a having NFC operational components 101, an inductive coupler 102 and a power deriver 103 coupled between the coupler 102 and a chargeable power supply 104 chargeable by the power deriver 103. The NFC communications enabled device 100 may or may not also have or be capable of being connected or coupled with at least one of other functionality 105 (for example functionality of a host device such as described above) and a user interface 106.

In the example shown in FIG. 2, the coupler 102 comprises a series connection to earth (ground) of a capacitor 113 and an inductor 112. As another possibility a parallel circuit configuration may be used, one example of which will be described below with reference to FIG. 3. The exact design of the inductor and inductive coupler will depend on the functionality, range and emission standard compliance requirements, plus the environment within which the NFC communications enabled device 100 is designed to operate.

The NFC operational components 101 comprise a controller 107 for controlling overall operation of the NFC communicator. The controller 107 is coupled to a data store 108 for storing data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store.

The NFC operational components 101 also comprise a demodulator 114 coupled between the coupler 102 and the controller 107 for demodulating a modulated RF signal inductively coupled to the coupler 102 from another near field RF communicator in near field range and for supplying the thus extracted data to the controller 107 for processing.

In addition the NFC operational components 101 include components for enabling modulation of an RF signal to enable data to be communicated to another near field RF communicator in near field range of the NFC communicator 100a.

As shown in FIG. 2, the NFC operational components 101 comprise a modulator 110 coupled via a driver 111 to the coupler 102. The modulator 110 may, for example, switch a transistor (for example a FET) coupled across the inductor 112 on and off in accordance with the data supplied by the controller 107, thereby modulating the load on the inductor 112 and thus an RF signal supplied by the NFC communicator in accordance with that data. Alternatively or additionally modulation of an RF signal may be provided by sine synthesis (which for example may generate a PDM (Pulse Density Modulation) signal to the driver 111). As a further alternative the NFC communicator may comprise an emulator intended to enable interference or simulated load modulation of a received RF signal as described in greater detail in WO 2005/045744, the whole contents of which are hereby incorporated by reference. In this latter case, the signal generator will be replaced by the circuitry described in WO 2005/045744 that enables interference or simulated load modulation of a received RF signal.

The NFC communicator 100*a* may operate in an initiator mode or a target mode, dependent on the mode to which the NFC communicator is set. The mode may be determined by the controller 107 or may be determined in dependence on the nature of a received near field RF signal. When in initiator mode, an NFC communicator initiates communications with any compatible near field RF communicator capable of responding to the initiator mode NFC communicator (for example an NFC communicator in target mode or an RFID tag or transponder) that is in its near field range, while when in target mode an NFC communicator waits for a communication from a compatible near field RF communicator that is capable of initiating near field communication a (for example an NFC communicator in initiator mode or an RFID reader or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693.

When in initiator or target mode, the NFC communicator may communicate in accordance with an active or passive protocol. When using an active protocol the initiating NFC communicator will transmit an RF field and following completion of its data communication turn off its RF field. The responding RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received form the controller 107 and the response received from a responding RF communicator.

When an NFC communicator as shown in FIG. 2 is in initiator mode (and therefore is transmitting an RF signal), the controller 107 is configured to control the modulator and signal generator to transmit a modulated or un-modulated RF signal through driver 111. Modulation will be in accordance with at least one of data held in data store 108 and control data held within controller 107. The data communicated will depend upon the communications protocol under which the NFC communicator is operating and the data stored in the data store 108. For example, the initial data communicated may be a wake-up instruction (for example REQA) to any receptive device (for example an NFC communicator in target mode or an RFID transponder) in near field range.

Figure 3:
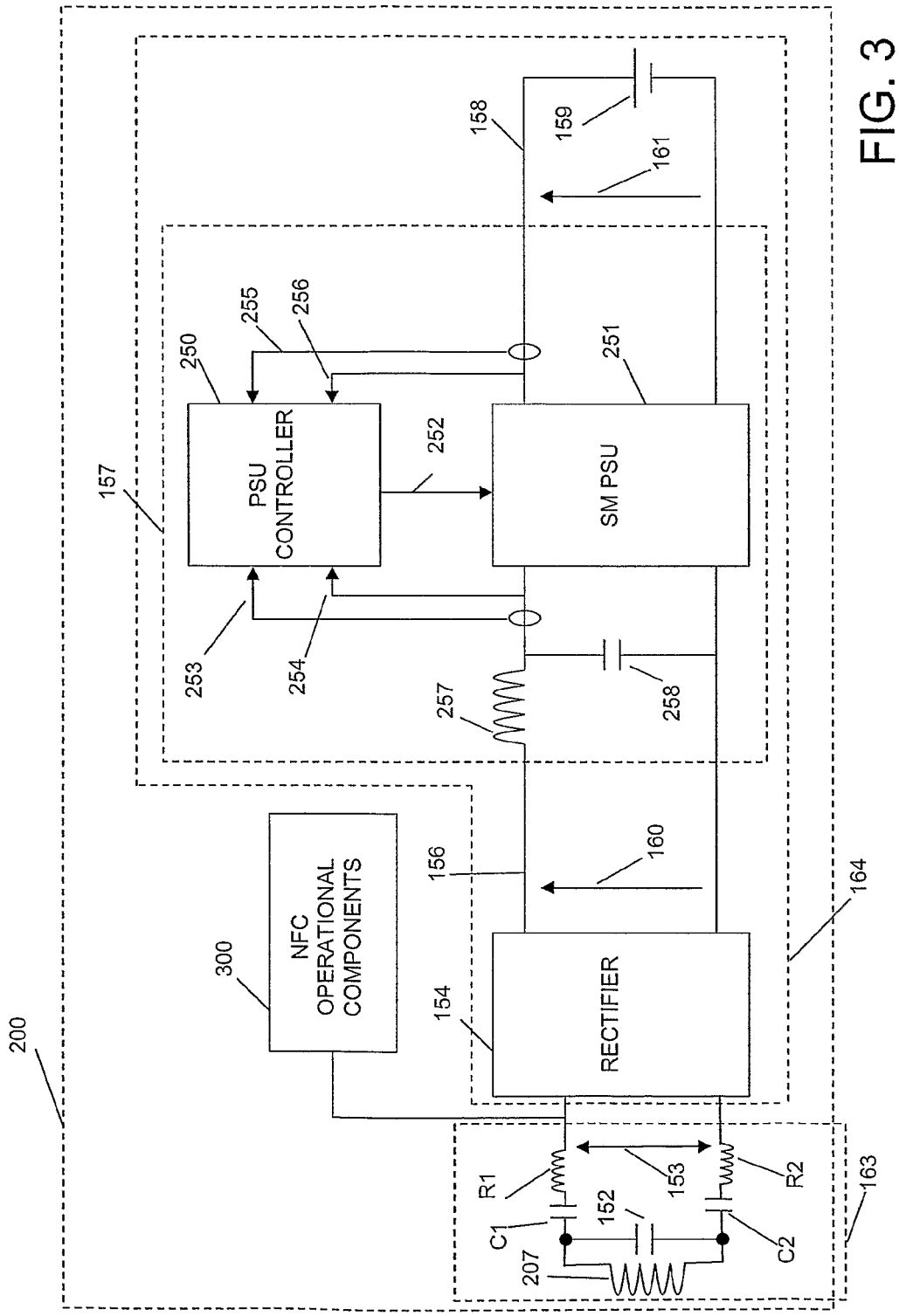
FIG. 3 shows a functional block diagram of an NFC communicator illustrating one example of a power deriver that may be used to derive power to charge a chargeable power supply.

When an NFC communicator as shown in FIG. 3 is operating in target mode, it will wait to receive an RF signal from an initiator mode NFC communicator or RFID reader through the coupler 102. On receipt of such an RF signal, the demodulator 114 will demodulate the RF signal to extract any data carried by the RF signal and will supply a digital data signal to the controller 107. The demodulated signal may be, for example, a wake-up instruction (for example REQA). The controller 107 will respond to such received data in accordance with its programming and/or data stored in the data store 108. Response in target mode may be through load modulation of the received RF signal (through modulation of load on inductor 112). Alternatively certain NFC communicators may respond through interference with the received RF signal or alternatively through transmission of a modulated RF signal (as described above).

The initial response of the controller 107 in the target mode to a wake up request may be to modulate the RF signal with an ATQA response or equivalent. Thereafter data communication between the initiator and target will occur by modulation of the RF signal or signals in accordance with the communications protocol under which the communicating devices operate or have agreed to operate where there is more then one possibility. Any suitable form of modulation scheme may be used, for example FSK (Frequency Shift Key) modulation, PSK (Phase Shift Key) modulation, PDM (Pulse Density Modulation), amplitude modulation, or load modulation.

As set out above, the NFC communications enabled device shown in FIG. 2 has its own chargeable power supply 104 (which may be part of the NFC communicator or may be the power supply of a host device) and when that chargeable power supply 104 is drained or is not fully charged, the power deriver 103 of the NFC communications enabled device may derive power from any suitable RF signal within near field range of the coupler 102 so as to charge the chargeable power supply 104. A suitable RF signal may be for example an RF signal supplied by another NFC communications enabled device or near field RF communicator (for example an RFID reader or an RFID tag if the tag is capable of supplying sufficient power).

As will be appreciated from the above, the controller 107 is operable to control the NFC communications process to, for example, ensure that the NFC communicator operates in compliance with the appropriate communications protocol(s) and to control the timing (using its own clock where appropriate), manner and mode of operation of the NFC communicator. The controller 107 is also operable to control communication with any host device, where required. Depending upon the circumstances, a change in functionality of the NFC communicator or of any host device may arise as a result of communication with another NFC communications enabled device. Alternatively communication may result in a change to the data stored in either one or both of the data store 108 and controller 107.

The functionality of the controller 107 is shown in FIG. 2 as being entirely within the NFC communicator. As other possibilities, the functionality of the controller 107 may be entirely within any host device controller or distributed between the NFC communicator and the host device. As a further possibility, certain control functionality may reside within a separate unit which is attachable or removable or alternatively only used for certain transactions, for example a security device or ESD device which may only be used for payment transactions. Where the functionality of the controller 107 is within a separate unit or within any host device, then instead of the controller 107 the NFC communicator will have a coupling, possibly including an appropriate interface, to that controller.

As shown in FIGS. 1 and 2, the data store 108 comprises a memory within the NFC communicator. As another possibility, the data store 108 may be comprised within any host device or shared or co-located memory device or data storage means. For example the data store may reside within the host device and all data may be centrally held within such host device. Alternatively data may be stored both within the NFC communicator (for example data relevant to operation of the NFC functionality) and within a memory (not shown) within the host device (for example data relevant to the operation characteristics of the host device). The data storage means may be read only or may be read/write, depending upon whether data is to be written to as well as read from the data store.

FIG. 3 shows a functional block diagram of an NFC communicator to illustrate one example of a power deriver that may be used in an NFC communications enabled device embodying the invention. The power deriver 103 shown in FIG. 2 may be of the type shown in FIG. 3.

The NFC communicator 200 shown in FIG. 3 again has an inductive coupler 163 coupled to NFC operational components 300 (shown as a single functional block 300 in FIG. 3) and to a power deriver 164 which is coupled to a chargeable power supply 159 that, although not shown in FIG. 3, is coupled to provide power to the various components of the NFC communicator. Although not shown in FIG. 3, the NFC communicator 200 may (or may not) have other functionality and a user interface as shown in FIG. 2. As another possibility the other functionality and/or user interface may be provided by a host device incorporating the NFC communicator or to which the NFC communicator is attached or coupled. The power supply 159 may comprise a power supply of the NFC communicator, the host device or both. The NFC operational components 300 may be as described above with reference FIG. 2.

In the example shown in FIG. 3, the coupler has a parallel circuit configuration and comprises a parallel coupling of an inductor 207 in the form of an RF antenna and a capacitor 152 with one end of the parallel coupling being coupled to the power deriver 164 by a first series connection of a capacitor C1 and a resistor R1 and the other end of the parallel coupling being coupled to the power deriver 164 by a second series connection of a capacitor C2 and a resistor R2. As another possibility a series type inductive coupler such as that shown in FIG. 2 may be used. As set out above, the exact design of the inductor and inductive coupler will depend on the functionality, range and emission standard compliance requirements, plus the environment within which the NFC communications enabled device is designed to operate.

As shown in FIG. 3, the power deriver 164 comprises a rectifier 154 for generating a rectified power output (represented by arrow 160) from an RF signal coupled to the coupler 163 and a charging unit 157 for generating a charging power output (represented by arrow 161) from the rectified output.

The rectifier 154 may be any suitable form of rectifier, for example a bridge rectifier, half-wave rectifier, or voltage doubler. Where the NFC communicator or NFC communication enabled device is comprised within an integrated circuit or series of integrated circuits, the rectifier 154 may advantageously be produced by an on-chip rectification circuit functioning as a bridge rectifier.

The charging unit 157 is desirably configured to control the charging process so as to achieve charging of the chargeable power supply 159 in the most efficient manner possible and to optimize the power transfer according to the charging requirements of the chargeable power supply 159.

The chargeable power supply 159 is shown in FIG. 3 as a battery and may consist of one or more cells. The chargeable power supply 159 may however be of any form that can be charged or re-charged via electrical power, such as for example a capacitor, button cell, battery.

FIG. 3 shows a functional block diagram of one suitable form of charging unit 157. As shown in FIG. 3, the charging unit 157 comprises a switched mode power supply unit (SM PSU) 251 controlled by power supply unit (PSU) controller 250 via signal line 252. The power supply controller 250 may be a microcontroller, microprocessor, digital signal processor or state machine, for example.

As set out above, the fact that the PSU controller 250 is shown as a separate functional block does not necessarily mean that it is a separate entity, for example the power supply unit (PSU) controller 250 may be separate from or included within any other controller functionality within the NFC communicator 200 for example within the controller 107 shown in FIG. 2.

The rectified output voltage node 156 of the rectifier 154 is coupled to an input of the SM PSU 251. This coupling may be via an inductor 257 to make power-factor corrections in order to increase power transfer efficiency as is well known to persons skilled in the art. If present, then, for a typical RF input frequency of 13.56 MHz, the inductor 257 will typically have a value of between 10-100 micro Henries. It is advantageous, but not essential, to include the inductor 257. As is standard practice for power derivation and supply, a capacitor 258 is coupled across the input to the SM PSU 251 to smooth the rectified AC cycles.

The PSU controller 250 is configured to monitor the input voltage 254, input current 253, output voltage 256 and output current 255 of the SM PSU 251 to ensure matching of the source and input impedances and therefore to ensure maximal power transfer. The source impedance includes all impedances in the power coupling path including the effects of mutual inductance from coupling between the inductive coupler 163 and another inductive coupler presented at the input of the SM PSU 251 while the input impedance of the SM PSU 251 is affected by the impedance of the chargeable power supply 159 and any circuit coupled to the chargeable power supply 159.

In addition to impedance matching, the PSU controller 250 is, of course, operable to control the SM PSU 151 such that the values of output voltage 256 and output current 255 are appropriate to achieve correct charging of the chargeable power supply 159.

Although FIG. 3 shows the use of a switched mode power supply unit, any suitable form of charging unit 157 may be used in an NFC communicator or NFC communications enabled device embodying the invention, for example a linear control regulator may be used.

During operation of the NFC communicator shown in FIG. 3, a power supply for the NFC communicator and possibly any host device may be derived from the chargeable power supply 159 or from the output of the rectifier 154 or the output of the charging circuit 157 or any combination of these. Using power derived by the power deriver 164 directly to power parts of the NFC communicator and/or any host device where possible rather than relying on the chargeable power supply 159 of course avoids draining the chargeable power supply.

Figure 4:
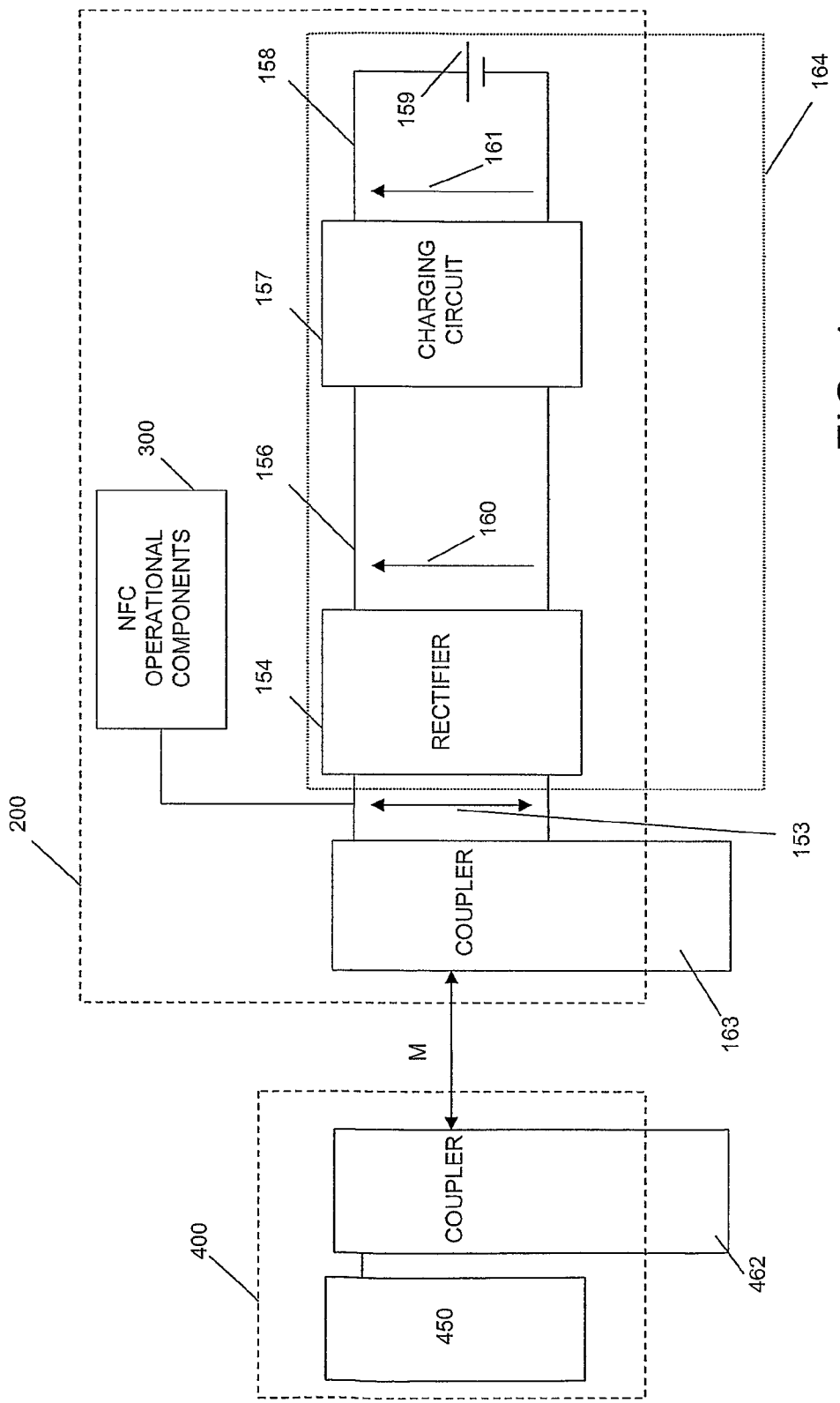
FIG. 4 shows a functional block diagram illustrating communication between the NFC communicator shown in FIG. 3 and another NFC communicator.

FIG. 4 shows a functional block diagram for assisting in further explaining examples of how NFC communicator or NFC communications enabled device 200 may derive power from another near field RF communicator 400.

The power deriving NFC communicator 200 shown in FIG. 4 is as described above with reference to FIGS. 2 and 3 and the same numbering is used where relevant. The power providing near field RF communicator 400 may be an NFC communicator or NFC communications enabled device similar to that described above in relation to FIGS. 2 and 3 or may comprise another form of near field RF communicator which is capable of communicating via inductive coupling, with the first NFC communicator 200. The second power providing near field RF communicator may be an RFID transceiver when the power deriving NFC communicator is operating in target mode and could possibly be an RFID tag when the power deriving NFC communicator is operating in initiator mode, if the RFID tag can provide sufficient power.

As described above, each of the communicators shown in FIG. 4 may or may not have additional functionality, that is the functionality may be provided within or attached to a host device such as those described above. In the latter case, functionalities such as processing power and/or data storage may be shared with the host device.

The near field RF communicator 400 comprises, in the example shown in FIG. 4, an NFC communicator having NFC operational components 450 and an inductive coupler 462 shown for simplicity simply as a block. The inductive coupler 462 is a tuned circuit comprising a capacitor and an inductor formed as an antenna and may have any of the configurations discussed above with reference to FIGS. 2 and 3 the exact design of the inductor and inductive coupler depending on the functionality, range and emission standard compliance requirements, plus the environment within which the RF communicator 400 is designed to operate.

The near field RF communicator 400 has its own power supply (not shown). This power supply may be specific to the near field RF communicator 400 or may form part of a host device and may be, for example a battery or mains supply. This power supply powers the operation of the near field RF communicator 400 when, for example, it acts as an initiator, that is when the NFC operational components 450 generate an RF signal which is fed to the inductive coupler 462.

When the coupler 163 of the first NFC communicator 200 is in near field range, the magnetic field (H-field) produced by the RF signal supplied to the inductive coupler 462, is inductively coupled to the coupler 163 of the first NFC communicator 200 (in FIG. 4 M denotes the mutual inductance between the two inductors of the inductive couplers 462 and 163). The near field range, that is the range or distance over which inductive coupling arises between the couplers 462 and 163, will depend on the apparatus involved, in particular the antenna design and position of antenna. Ranges of up to several centimetres are common for NFC communications enabled devices.

In the manner described above and with reference to FIG. 3, the power deriver 164 derives power from the inductively coupled RF signal transmitted by the second NFC communicator 400. Thus, the RF signal inductively coupled to the coupler 163 is converted by the rectifier 154 to a DC signal 160 which is in turn converted via the charging unit 157 into an appropriate charging signal 161 to charge the chargeable power supply 159.

In FIG. 4 the NFC communicator 200 receives power and the other near field RF communicator 400 provides or transfers power. However, as will be appreciated, an NFC communicator or NFC communications enabled device embodying the invention may comprise both the ability to receive power and the ability to transfer power and, for example, whether an NFC communicator or NFC communications enabled device is operable to derive or provide power may depend upon the particular circumstances (for example the relative levels of available power) or particular configurations or modes of operation of the two communicators or devices when they come into near field range of one another.

As described above, power derivation may occur in a variety of ways or modes of operation and may occur during or independently of data communication between the NFC communicators. A number of examples of ways in which power may be derived will now be described. It should however be appreciated that these are only examples.

In one example, a first, power requiring NFC communicator or NFC communications enabled device such as the first NFC communicator 200 shown in FIG. 4 may derive power from a second, power providing NFC communicator or NFC communications enabled device such as the second near field RF communicator 400 shown in FIG. 4 when data is not being communicated. In this example, the second near field RF communicator or near field RF communications enabled device is operable to generate an un-modulated RF field from which an in-range NFC communicator or NFC communications enabled device embodying the invention may derive power to charge a chargeable power supply. The second, power providing near field RF communicator or near field RF communications enabled device may be operable to generate the un-modulated RF field in response to receipt of a request from the first, power requiring NFC communicator or NFC communications enabled device and/or may be operable to generate the un-modulated RF field automatically at certain times or intervals, for example immediately following communication of data. In this example, the controller (see FIG. 3) may be configured to activate its power deriver in response to detection of an un-modulated RF field so as, as discussed above with reference to FIG. 3, to derive a power supply from the un-modulated RF signal supplied by the second near field RF communicator or near field RF communications enabled device. Alternatively the power deriver may be activated when battery power is low by, for example user intervention or following data communication or initially at the start of data communication to ensure sufficient power is stored to carry out the necessary data communication. The derived power may be used directly to power components of the first NFC communicator or NFC communication enabled device (and possibly of any host device) and/or to charge or recharge its chargeable power supply.

In another example where a first, power requiring NFC communicator or NFC communications enabled device such as the first NFC communicator 200 shown in FIG. 4 may derive power from a second, power providing near field RF communicator or near field RF communications enabled device such as the NFC communicator 400 shown in FIG. 4, the second near field RF communicator or near field RF communications enabled device may transmit a different RF frequency for power derivation than for data communication and the NFC operational components of the first, power requiring NFC communicator or NFC communications enabled device may comprise a frequency detector and be operable to switch to a power derivation mode in which the power deriver is activated when that different RF frequency is detected. In this example, communication of data occurs independently from communication of power.

In another example where a first, power requiring NFC communicator or NFC communications enabled device such as the first NFC communicator 200 shown in FIG. 4 may derive power from a second, power providing near field RF communicator or near field RF communications enabled device such as the second NFC communicator 400 shown in FIG. 4, communication of power and data may be simultaneous and utilize the same RF field. In such circumstances the power deriver will be activated to enable charging of the chargeable power supply following receipt of an RF field by the first NFC communicator or NFC communication enabled device. Multiple inductive couplers may be included within the first NFC communicator or NFC communications enabled device to maximize transfer of power. Such simultaneous power transfer may also assist to minimize or control power usage within the NFC communicator or NFC communications enabled device. Where power transfer occurs alongside communication of data or directly following such communication, the chargeable power supply within the NFC communicator or NFC communications enabled device may be topped up during or shortly after data communication so as to avoid drain of power supply, particularly of any host device. This may be particularly advantageous where a large amount of data needs to be transferred. For example where as in FIG. 1 the NFC communications enabled devices comprise a mobile telephone and a portable computer such as a laptop, the power supply within the portable computer can be used to replenish the chargeable power supply of the mobile telephone after use, to prevent the mobile telephone battery being drained.

Where power transfer occurs simultaneously with data communication or directly following data communication, the controller of the first, power requiring NFC communicator or NFC communications enabled device may maximize RF field availability for power transfer either by prolonging data communication with the second, power providing near field RF communicator or near field RF communication enabled device or by instructing the second, power providing near field RF communicator or near field RF communications enabled device to maintain its RF field. Further data communication (in the form of data to be stored and/or instructions) may follow once sufficient power transfer has occurred.

In another example where a first, power requiring NFC communicator or NFC communications enabled device such as the first NFC communicator 200 shown in FIG. 4 may derive power from a second, power providing near field RF communicator or near field RF communications enabled device such as the second NFC communicator 400 shown in FIG. 4, power transfer may be brought about or maximized through a change in normal operation of the second, power providing near field RF communicator or near field RF communications enabled device. Thus, where the second, power providing near field RF communicator or near field RF communications enabled device is or comprises an NFC communicator similar to that described in FIG. 3 and is operating in target mode, communication with the first power requiring NFC communicator or NFC communications enabled device may cause the second near field RF communicator or near field RF communications enabled device to switch from target mode to initiator mode, thereby permitting the first NFC communicator or NFC communications enabled device to derive a power supply from a supplied RF signal. Where the second near field RF communicator is operating as an initiator but in accordance with the active protocol, communication with the first power requiring NFC communications enabled device may cause the second near field RF communicator to switch to the passive protocol thereby supplying a constant RF field from which the second near field RF communicator can derive a power supply.

A power requiring NFC communicator may also request another NFC communicator to change from target to initiator mode (and vice versa) so that the power requiring NFC communicator may derive a power supply from an RF signal generated by the other NFC communicator.

Also, an NFC communicator or communications enabled device may issue (by modulating an RF signal) a request for power transfer automatically, for example where the relevant power supply is close to exhaustion.

Thus, there is a number of ways in which power derivation may be controlled, for example, power may be derived, automatically before, during or after data communication or upon user instruction or only upon agreement between the two NFC communicators or NFC communications enabled devices, for example a controller of one of the two communicators or devices may request, if the controller determines that its chargeable power supply needs charging, an opportunity to derive power when in communication with the other NFC communicator or NFC communications enabled device and may activate power derivation in response to acceptance of the request. As another possibility, an NFC communicator or NFC communications enabled device may transmit an RF signal that indicates (for example is un-modulated or is modulated in a certain way) to another NFC communicator or NFC communications enabled device in near field range the availability of a RF signal for use in power derivation.

As described above, a first, power requiring NFC communicator or NFC communications enabled device may operate in a data communication mode and a power derivation mode. A second, power providing near field RF communicator or near field RF communications enabled device may similarly have a data communication mode and a power supply mode. Depending upon their functionality, either or both of the communicators or communications enabled devices may also have a third mode, a power derivation mode for the second near field RF communicator or near field RF communications enabled device and a power supply mode for the first NFC communicator or NFC communications enabled device. The mode of operation of an NFC communicator or near field RF communicator will be determined by a controller controlling operation of the NFC communicator or near field RF communicator and a mode change may be as a result of user intervention, on completion of any data communication (that is when no other data communication is occurring) on receipt of a request for power transfer from another near field RF communicator or near field RF communications enabled device or on detection of another near field RF communicator or near field RF communications enabled device. In power transfer mode, an near field RF communicator controller may instruct switching functions within the near field RF communicator to change the generated signal properties and/or circuit configuration to facilitate and maximize power transfer. Also, during power transfer, the power providing near field RF communicator may suspend data communication or processing of received data in order to maximize the power being transferred and therefore the replenishment of the chargeable power supply of the other power deriving near field RF communicator or near field RF communications enabled device.

As described above, an NFC communicator or NFC communications enabled device embodying the invention uses the same coupler or couplers for data communication and power derivation. This need not necessarily be the case and separate couplers may be used for data communication and power derivation by either one or both of two communicators or communications enabled devices.

Figure 5:
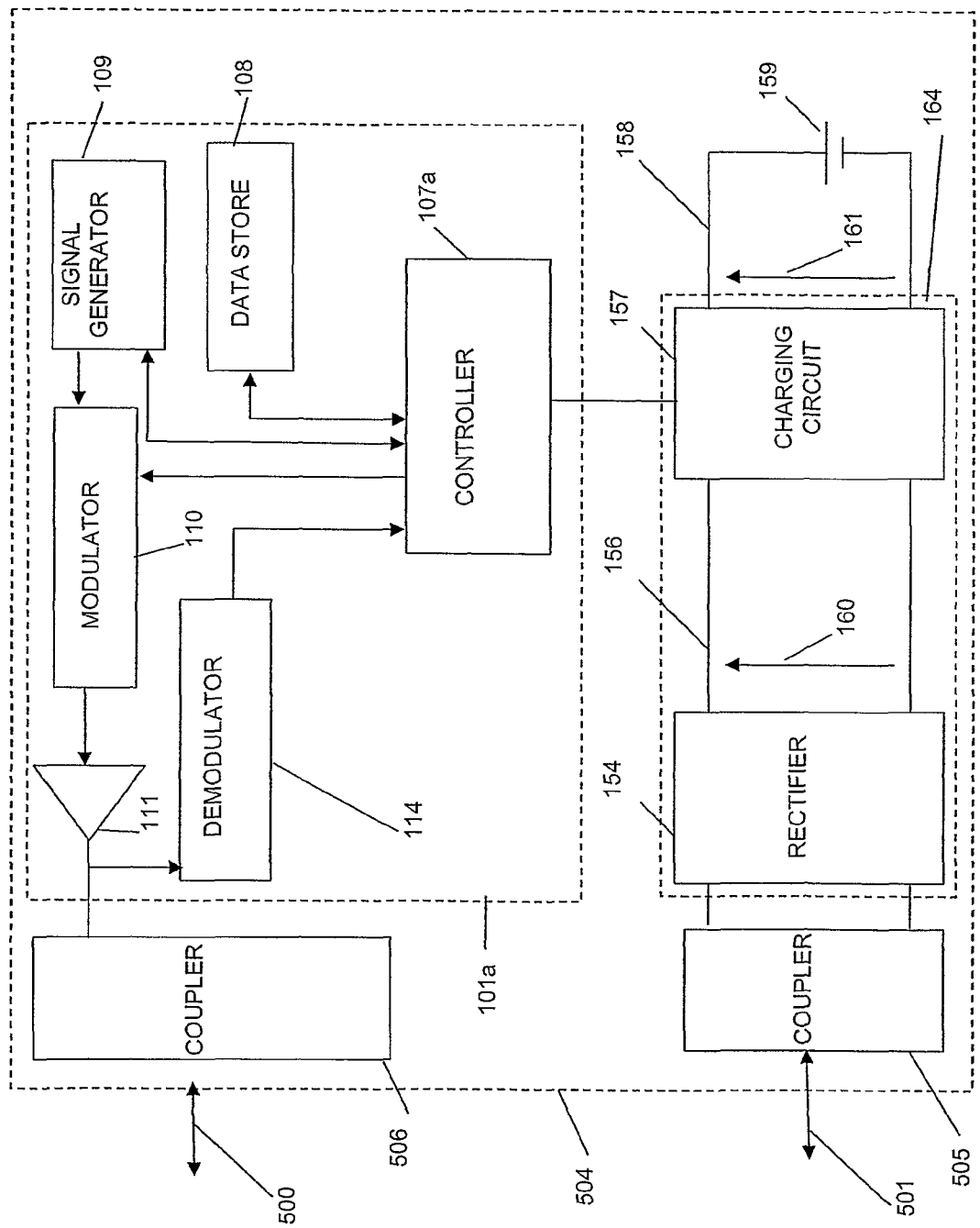
FIG. 5 shows a functional block diagram illustrating another example of an NFC communicator according to the present invention.

FIG. 5 shows a functional block diagram of an NFC communicator 600 having separate couplers for data communication and power derivation. Although not shown in FIG. 5, the NFC communicator 600 may or may not be associated with at least one of further functionality (that is it may form part of or be attached or associated with a host device) and a user interface.

The NFC communicator 600 shown in FIG. 5 comprises NFC operational components 101a which, like the NFC operational components 101 shown in FIG. 2, comprise a controller 107a for controlling overall operation of the NFC communicator coupled to a data store 108 for storing data to be transmitted from and/or data received by the NFC communicator; a demodulator 114 coupled between the coupler 102 and the controller 107 for demodulating a modulated signal inductively coupled to the coupler from another NFC communicator or NFC communications enabled device in near field range; a signal generator 109 for generating an RF signal, a modulator 110 for modulating an RF signal and a driver for driving a coupler 506 in accordance with the output of the modulator 110. The coupler 506 comprises an antenna coil or inductor 307 possibly associated, in the manner described above, with one or more capacitors 352. Although not shown in FIG. 5, the NFC communicator 600 may also be capable of interference or simulated load modulation in accordance with WO2005/045744. As thus far described, the NFC communicator 600 is similar to that shown in FIG. 3 and functions in similar manner. Like the NFC communicator shown in FIG. 3, the NFC communicator 600 also has a power deriver 164 (comprising, as shown a rectifier 154 and a charging circuit 157 which may be as described above) coupled to a chargeable power supply 159 which may be provided within or attached to the NFC communicator 600 or provided within or attached to another device associated with or incorporating the NFC communicator. However, in this example, the power deriver 157 is not coupled to the coupler 506 but is coupled to a separate coupler 505 again comprising an antenna in the form of a coil or inductor possibly associated, in the manner described above, with one or more capacitors.

The controller 107a is configured to control both the operation of the NFC operational components 101a and the power deriver 164 and in operation will control whether the coupler 506 or the power deriver 164 together with inductive coupler 505 is operable on receipt of an externally supplied RF signal (represented as arrows 500 and 501). In a preferred embodiment the controller 107a is operable to turn off the power deriver 164 until a set time or set series of instructions is received from an near field RF communicator or near field RF communications enabled device. For example on receipt of a modulated RF signal from another near field RF communicator or near field RF communications enabled device (not shown), the received modulated signal may be demodulated by demodulator 114 and interpreted by controller 107a. Depending on the data received, the controller 107a may then cause a modulated RF signal modulated in accordance with the appropriate operating protocol and data stored in the data store 108 to be transmitted for receipt by the other near field RF communicator or near field RF communications enabled device. Following completion of data communication between the two communicators or communications enabled devices, the controller 107a may then turn on the power deriver 164 and inductive coupler 505 or control switches in the paths from the two couplers so that the coupler 506 is disconnected from the NFC communicator 100a and the coupler 505 is connected to the power deriver so that an RF field generated by the other near field RF communicator or near field RF communications enabled device can then be used for charging purposes.

Alternatively both the power deriver 164 and the NFC operational components 101a shown in FIG. 5 may be operable at the same time and in response to the same RF field. The couplers may be configured using appropriate filter arrangements so that one is responsive to one frequency and the other to another frequency RF field with the different frequency fields being generated by the same or different NFC communications enabled devices. As in the other examples described above, the NFC communicator 600 shown in FIG. 5 may be a standalone NFC communicator or may be embodied in or associated with a host device. Where the NFC communicator is comprised within a host device, the controller 107a may interface with a controller of the host device and optionally the host device controller may control whether the NFC communicator is in a power derivation mode or a data communication mode or both.

The use of different frequencies for the two couplers 506 and 505 may minimize interference between the inductive couplers. Alternatively or additionally, the antennas 352 and 152 may be physically separated or orientated such that their axes are 90 degrees apart so that they respond to correspondingly orientated H fields.

A number of applications for NFC communicators and NFC communications enabled devices will now be described with the aid of FIGS. 6 to 9.

Figure 6:
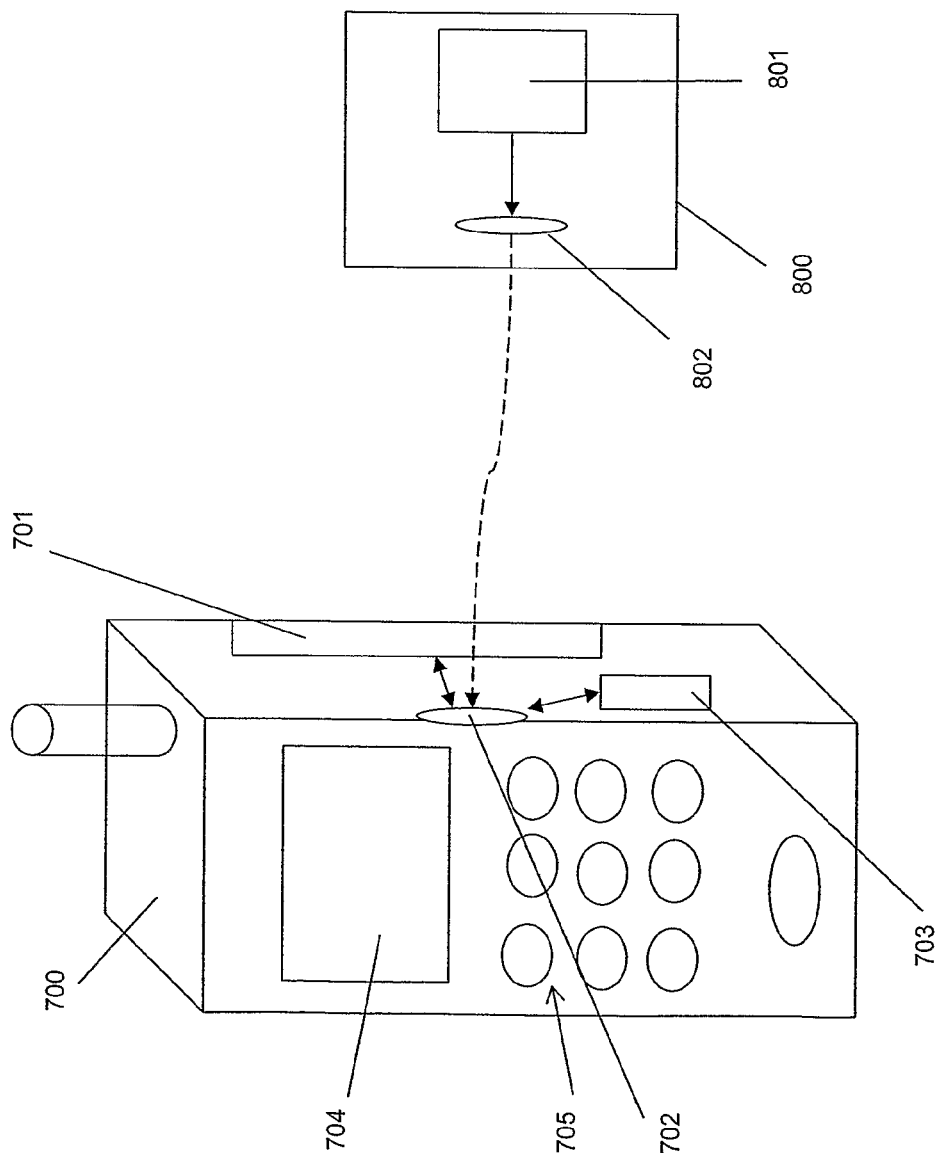
FIGS. 6 to 8 show diagrammatic representations of different examples of one NFC communications enabled device being used to charge a power supply of another NFC communications enabled device.

FIG. 6 shows a simplified view of two NFC communications enabled devices 700 and 800 communicating. In this example, one NFC communications enabled device 700 comprises a mobile telephone having the usual mobile telephone features including a mobile telephone chargeable battery 701 and an NFC communicator 702 having the features described above with reference to any of FIGS. 1 to 5 and, as shown an emergency chargeable power supply or battery 703 which may be attachable to and detachable from the mobile telephone. As shown by the solid double arrows in FIG. 6, the NFC communicator 702 is coupled to both the mobile telephone chargeable battery 701 and the emergency chargeable power supply or battery 703.

In this example, the other NFC communications enabled device 800 comprises an electrical device which may be any suitable electrical device such as a portable electrical device, a desk top electrical device or other item of office or home electrical equipment and so on. For example, the other NFC communications enabled device 800 may be a laptop or notebook computer or a computer peripheral such as a printer or keyboard. In addition to its normal functionality (not illustrated in FIG. 6) and a power supply 801 which may be a mains or battery power supply, the other NFC communications enabled device 800 has an NFC communicator as described above coupled to derive power from the power supply 801. In the alternative the RF field from which the power is derived may be supplied by an RF communicator (whether stand-alone or comprised within a host device).

In the scenario shown in FIG. 6 when, for example, either the mobile telephone functionality or the user determines that the battery is low, then the user (possibly after prompting by the mobile telephone) brings the mobile telephone 700 into near field range of the other NFC communications enabled device 800 and (possibly only after the user has confirmed that the NFC communications enabled devices are in near field range using the key pad 705), the NFC communicator 702 issues (by modulating an RF signal) a request for power transfer to any NFC communications enabled device in near field range. As another possibility, the NFC communicator 702 may be periodically activated to check for any in-range NFC communications enabled devices and may cause a controller of the mobile telephone to display on the display 704 a message to the user asking whether power transfer is required, whenever there is a power providing NFC communications enabled device in near field range. Then, if the user selects power transfer using the keypad 705, the mobile telephone controller will instruct the NFC communicator 702 to issue (by modulating an RF signal) a request for power transfer to any NFC communications enabled device in near field range.

Once communication between the two NFC communications enabled devices has been established, then the NFC communicator 702 may derive power from an RF signal supplied by the NFC communicator 802 in any of the ways described above.

Alternatively the user may control the operation of NFC communications device 800 such that it is automatically in 'power providing' mode and constantly transmitting an RF signal. When the user brings NFC communications enabled device 700 into the near field range of device 800, the NFC communicator within mobile phone 700 automatically derives power from the supplied RF signal and uses the derived power to top-up the mobile phone battery or to trickle charge some alternative or additional power supply.

The NFC communicator 702 may additionally (or alternatively) charge up or trickle charge the emergency battery 703 for later use with the mobile telephone or other compatible device.

In addition in FIG. 6, data may be communicated by NFC communication between the NFC communicators of the two devices so that, for example, data (such as for example personal organizer data, music data, video data and so on) may be transferred between the portable computer and mobile telephone.

Figure 7:
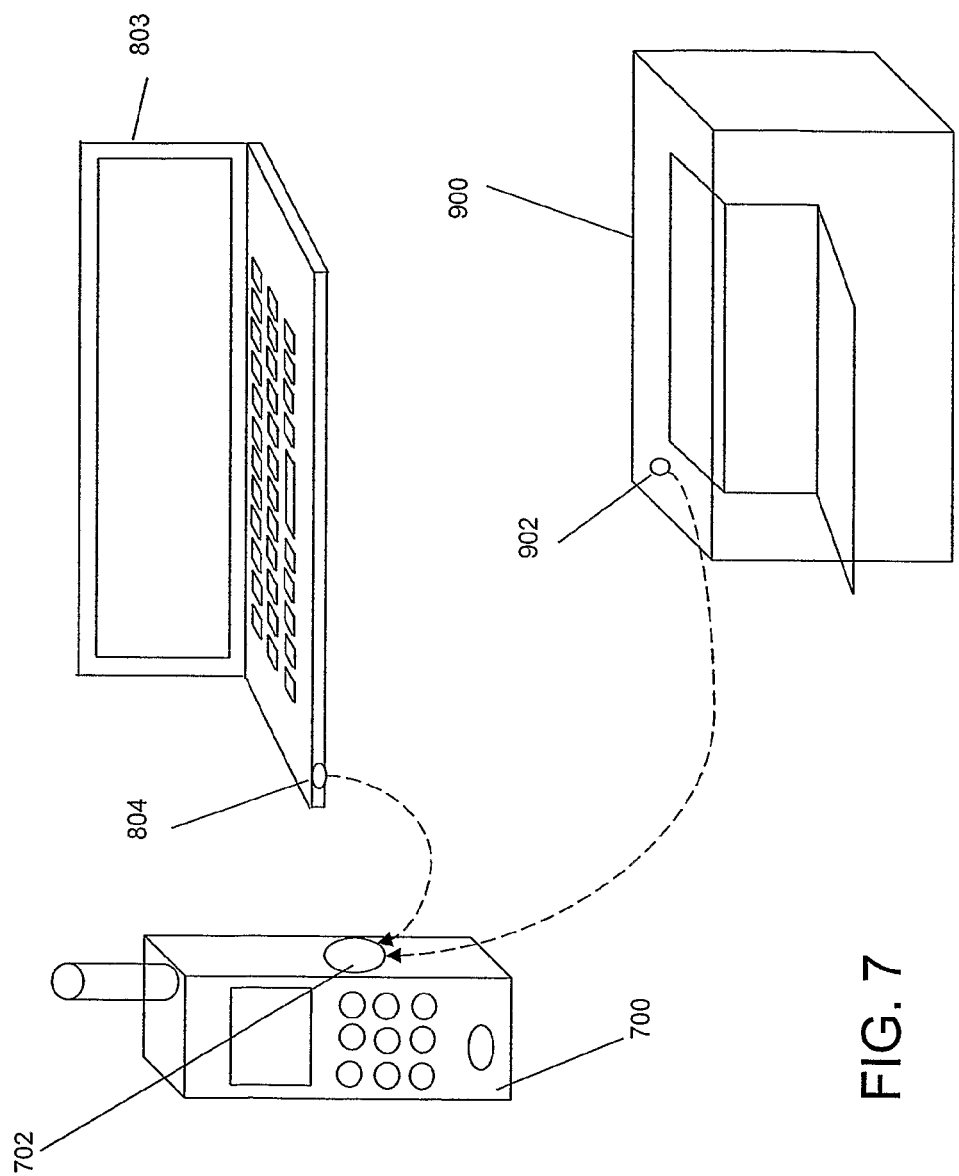

FIG. 7 shows another scenario in which the NFC communications enabled mobile telephone 700 is in near field range of two NFC communications enabled devices, a portable computer (laptop or notebook computer) 803 and a printer 900 which will generally, although not shown, be mains powered. In this case, as shown by the dashed lines, the mobile telephone NFC communicator 702 may derive power for itself and/or the mobile telephone as discussed above from near field RF signals transmitted by either the portable computer NFC communicator 804 or the printer NFC communicator 902 or a combination of both. Also although not shown in FIG. 7, the portable computer NFC communicator 802 may derive power for itself and/or the portable computer from the near field RF signal transmitted by the printer NFC communicator 902. In addition, data may be communicated by NFC communication between the NFC communicators 702, 804 and 902 of the three devices so that, for example, data stored by the portable computer or mobile telephone may be supplied to the printer for printing by NFC communication and data (such as for example personal organizer data, music data, video data and so on) may be transferred between the portable computer and mobile telephone.

Figure 8:
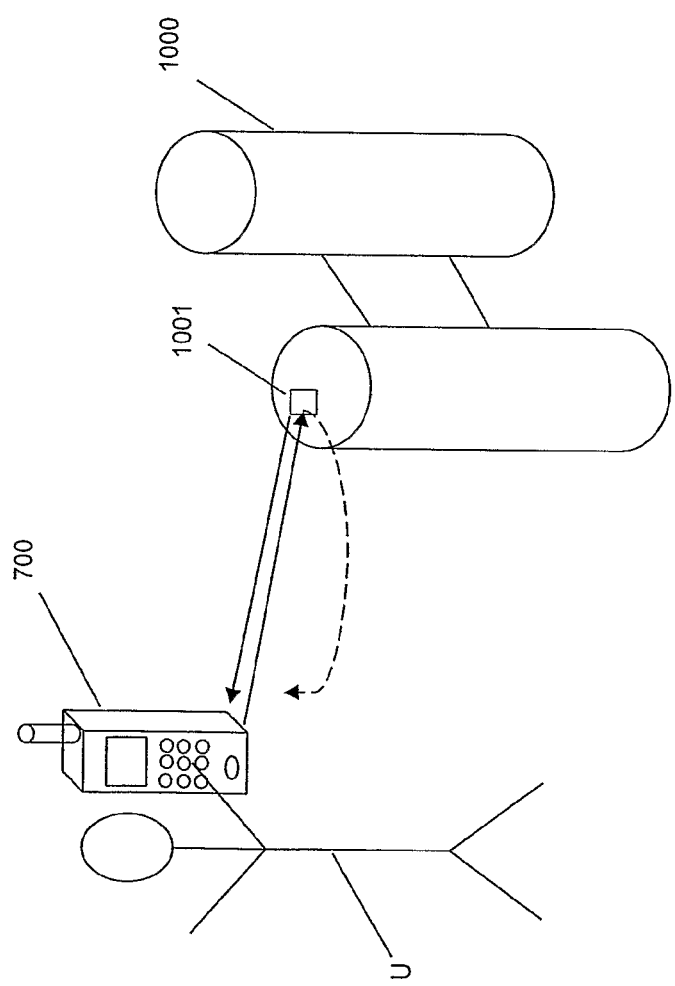
Figure 9:
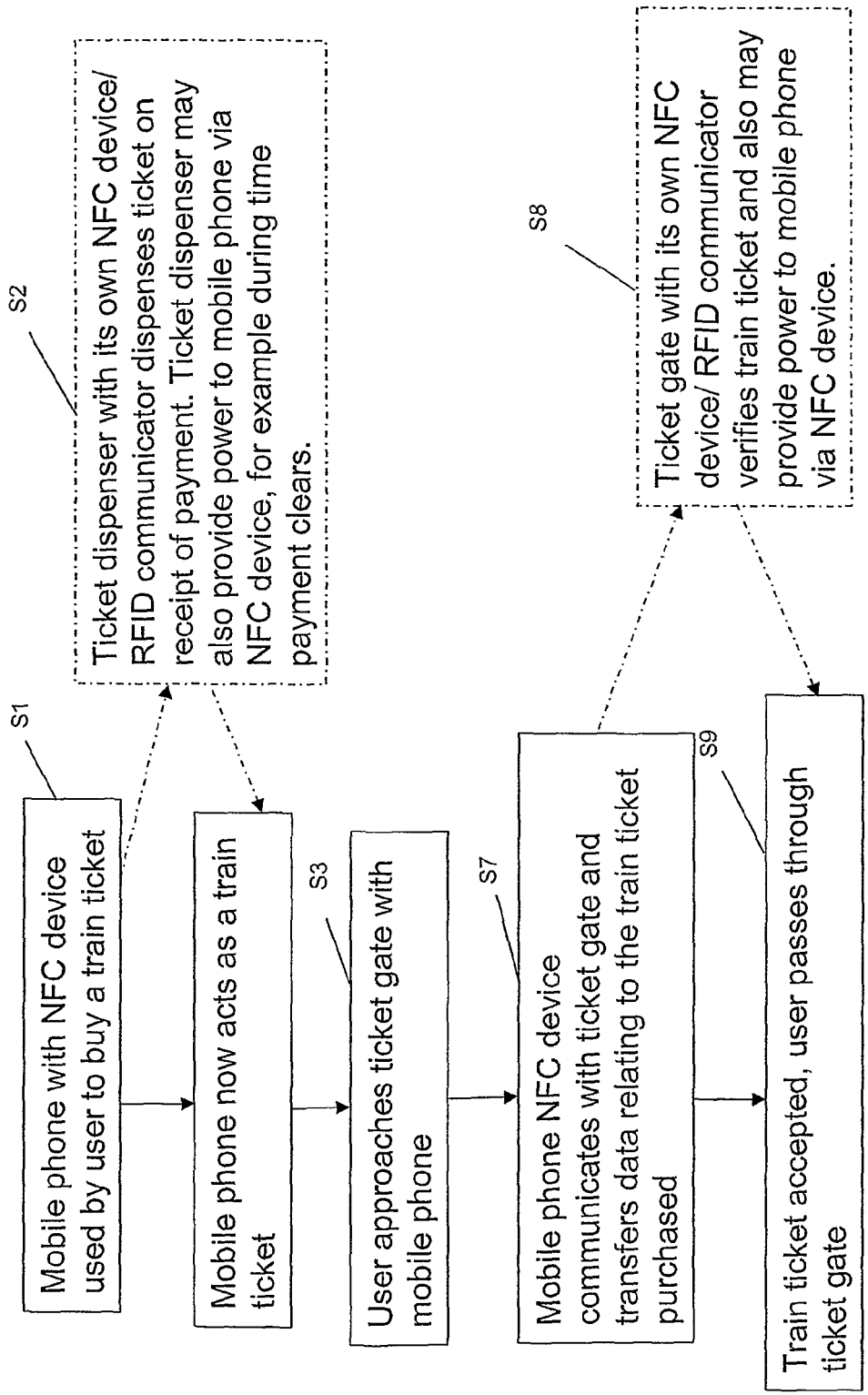
FIG. 9 shows a flowchart for illustrating use of an NFC communications enabled device such as a mobile telephone to obtain a ticket and then to gain entry through an access gate controlled by that ticket.

FIGS. 8 and 9 illustrate another scenario in the form of an access system in which an NFC communications enabled mobile telephone 700 (or other portable electrical device such as a PDA) is programmed with ticket or access pass software for enabling the user to obtain an electronic ticket, access pass or authorization code such that, when the NFC communicator (not shown in FIG. 8) of the mobile telephone 700 is in near field communication with an NFC communicator 1001 of an access gate 1000 responsive to that electronic ticket, access pass or authorization code, access will be granted to the user (u) of that mobile telephone.

FIG. 9 shows a flow chart for explaining the functioning of such an access system.

Thus at S1, in response to user input via the keypad, the mobile telephone 700 obtains an electronic ticket, access pass or authorization code for the access gate, as shown in FIG. 9 by the user purchasing a train ticket. As shown at S2, the electronic ticket, access pass or authorization code may be obtained by NFC communication with, for example, an automatic ticket dispenser comprising an NFC communications enabled device embodying the invention which may also be used, as described above, to power or charge up the mobile telephone, for example while the users payment is being cleared by communications between the ticket dispenser and a transactions house in the same manner as would be used for a credit transaction. As another possibility, the electronic ticket, access pass or authorization code for the access gate may be purchased over the mobile telecommunications network or by the user from a ticket kiosk in which case the user will need to enter the electronic ticket, access pass or authorization code provided by the human ticket vendor into the mobile telephone using its keypad.

Once the electronic ticket, access pass or authorization code is stored in the mobile telephone at S3 the mobile telephone 700 is programmed to function as the electronic ticket, access pass or authorization code provider.

The user then brings at S5 the mobile telephone into near field communication range of the NFC communicator 1001 of the access gate 1000 and, at S7, the NFC communicator of the mobile telephone communicates with the NFC communicator 1001 of the access gate to transfer, data representing the electronic ticket, access pass or authorization code. Such data may be encrypted or provided in protected format. At S8, the NFC communicator 1001 of the access gate 1000 receives the transferred data and it or a controller of the access gate checks the authenticity and correctness of the transferred data and, if it is authentic and correct, allows the user of the mobile telephone access through the access gate 1000.

It will of course be appreciated that the power deriver shown in FIG. 3 is only one possible example of a suitable power deriver and other circuit configurations may be advantageous in order to further maximize power transfer efficiencies.

The chargeable power supply may be the sole power supply of the NFC communications enabled device or alternatively may be one of a number of power supplies comprised within the NFC communications enabled device. For example, the NFC enabled device may have a separate power supply and the chargeable power supply may be used simply as a back-up in the event that power supply fails. In this case, the chargeable power supply may be incorporated within the NFC communicator or within the host device where the NFC communications enabled device has functionality beyond the NFC communicator functionality or may be provided as a separate power supply device couplable to the NFC communications enabled device. As another possibility or additionally, where the NFC communications enabled device has functionality beyond the NFC communicator functionality, the NFC communicator and host device may have separate power supplies that may be chargeable by the power deriver either directly or from a charged chargeable power supply itself charged directly by the power deriver. The power deriver may also be coupled and configured to trickle-charge or replenish a second power storage device. For example an available RF field may be used to re-charge a lap-top battery or mobile telephone battery. Additional circuitry may be included to selectively feed alternative DC and AC power sources to the input of the charging circuit or to the input of the rectifier, respectively, for example. A mains power-adapter is an example alternative DC power source.

In examples given above, both the power requirer and the power provider are NFC communicators or NFC communications enabled devices. In examples where the power provider has to be capable of initiating near field communication but does not have to be capable of responding to initiation of near field communication by the power requirer, then the power provider may be an initiating near field communicator such as an RFID transceiver or reader. In examples where the power provider has to be capable of responding to initiation of near field communication by the power requirer but does not have to be capable of initiating near field communication, then the power provider may be a responding near field communicator such as an RFID transponder or tag, if sufficient power can be provided. An NFC communicator may operate in accordance with ISO/IEC 18092 and/or ISO/IEC 21481 while an RFID reader or RFID tag may operate fully or partially in accordance with RFID ISO/IEC 1444 A or ISO/IEC 15693.

CONCLUSION

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A near field communications (NFC) enabled device, comprising:
   a first coupler configured to receive a first radio frequency (RF) signal inductively coupled onto a magnetic field;
   operational components configured to demodulate the first RF signal to provide received data;
   a second coupler configured to receive a second RF signal inductively coupled onto the magnetic field; and
   a power deriver configured to charge a chargeable power supply based upon the second RF signal, the NFC enabled device being configured to allow charging only when the second RF signal includes a permission to charge.

2. The NFC enabled device of claim 1, wherein the power deriver comprises:
   a rectifier configured to generate a rectified power output from the second RF signal; and
   a charging unit configured to generate a charging power output based upon the rectified power output to charge the chargeable power supply.

3. The NFC enabled device of claim 2, wherein the charging unit comprises:
   a switched mode power supply configured to generate the charging power output based upon the rectified power output; and
   a power supply unit controller configured to cause the switched mode power supply to adjust the charging power output to ensure that it is sufficient to charge the chargeable power supply.

4. The NFC enabled device of 2, wherein the charging unit comprises:
   a lineal regulator configured to generate the charging power output based upon the rectified power output; and
   a power supply unit controller configured to cause the linear regulator to adjust the charging power output to ensure that it is sufficient to charge the chargeable power supply.

5. The NFC enabled device of claim 1, wherein the chargeable power supply comprises:
   a battery having one or more cells.

6. The NFC enabled device of claim 1, wherein the first coupler is further configured to produce the magnetic field based upon a third RF signal.

7. The NFC enabled device of claim 6, wherein the operational components comprise:
   a demodulator configured to demodulate the first RF signal to provide the received data; and
   a modulator configured to modulate transmitted data to provide the third RF signal; and
   a controller configured to control operation of the NFC enabled device.

8. The NFC enabled device of claim 7, wherein the controller is further configured to activate the power deriver upon receipt of instructions over the first RF signal.

9. The NFC enabled device of claim 7, wherein the controller is further configured to detect whether the first RF signal represents an unmodulated RF signal and to activate the power deriver upon detecting the first RF signal is the unmodulated RF signal.

10. The NFC enabled device of claim 7, wherein the first RF signal and the second RF signal are characterized by a first frequency and a second frequency, respectively, the first frequency being different from the second frequency, and wherein the controller is further configured to activate the power deriver upon detecting the second frequency.

11. The NFC enabled device of claim 1, wherein the operational components are further configured to demodulate the first RF signal simultaneously with charging of the chargeable power supply.

12. A near field communications (NFC) enabled device, comprising:
   a demodulator configured to demodulate a first radio frequency (RF) signal that is inductively coupled onto a magnetic field by a second NFC enabled device; and
   a power deriver configured to charge a chargeable power supply based upon a second RF signal that is inductively coupled onto the magnetic field by the second NFC enabled device, the NFC enabled device being configured to allow charging only when the second RF signal includes a permission to charge,
   wherein the first RF signal and the second RF signal are characterized by a first frequency and a second frequency, respectively, the first frequency being different from the second frequency.

13. The NFC enabled device of claim 12, further comprising:
   a first coupler configured to receive the first RF signal; and
   a second coupler configured to receive the second RF signal.

14. The NFC enabled device of claim 12, wherein the demodulator is further configured to demodulate the first RF signal simultaneously with charging of the chargeable power supply.

15. A near field communications (NFC) enabled device, comprising:
   means for receiving a first radio frequency (RF) signal inductively coupled onto a magnetic field;
   means for demodulating the first RF signal to provide received data;
   means for receiving a second RF signal inductively coupled onto the magnetic field; and
   means for charging a chargeable power supply based upon the second RF signal, the NFC enabled device being configured to allow charging only when the second RF signal includes a permission to charge.

16. The NFC enabled device of claim 15, wherein the means for charging comprises:
   means for generating a rectified power output from the second RF signal; and
   means for generating a charging power output based upon the rectified power output to charge the chargeable power supply.

17. The NFC enabled device of claim 16, wherein the means for generating the charging power output comprises:
   means for generating a switched mode power output as the charging power output based upon the rectified power output; and
   means for adjusting the switched mode power output to ensure that it is sufficient to charge the chargeable power supply.

18. The NFC enabled device of claim 15, wherein the chargeable power supply comprises:
   means for storing power using one or more cells.

19. The NFC enabled device of claim 15, wherein the means for receiving the first RF signal further comprises:

means for producing the magnetic field based upon a third RF signal.

20. The NFC enabled device of claim 19, further comprising:
   means for modulating transmitted data to provide the third RF signal; and
   means for controlling operation of the NFC enabled device.

21. The NFC enabled device of claim 20, wherein the means for controlling operation comprises:
   means for activating the means for charging upon receipt of instructions over the first RF signal.

22. The NFC enabled device of claim 20, wherein the means for controlling operation comprises:
   means for detecting whether the first RF signal represents an unmodulated RF signal and to activate the means for charging upon detecting the first RF signal is the unmodulated RF signal.

23. The NFC enabled device of claim 20, wherein the first RF signal and the second RF signal are characterized by a first frequency and a second frequency, respectively, the first frequency being different from the second frequency, and wherein the means for controlling operation comprises:
   means for activating the means for charging upon detecting the second frequency.

24. The NFC enabled device of claim 1, wherein the operational components comprise:
   a controller configured to request, upon determination that the chargeable power supply requires charging, the permission from a second NFC enabled device that provides the second RF signal, wherein the controller only allows charging when the NFC enabled device receives the permission from the second NFC enabled device.

25. The NFC enabled device of claim 24, wherein the controller activates the power deriver to begin power derivation upon receipt of the permission.

* * * * *

UNITED STATES PATENT AND TRADEMARK OFFICE
CERTIFICATE OF CORRECTION

PATENT NO. : 8,432,293 B2
APPLICATION NO. : 11/795434
DATED : April 30, 2013
INVENTOR(S) : Peter Robert Symons It is certified that error appears in the above-identified patent and that said Letters Patent is hereby corrected as shown below:

In the Claims:

Column 19, Line 38, please replace "of 2" with --of claim 2--.

Column 19, Line 40, please replace "lineal" with --linear--.

Column 19, Line 54, please replace "the received data; and" with --the received data--.

Signed and Sealed this
Twenty-fourth Day of September, 2013

Teresa Stanek Rea
*Deputy Director of the United States Patent and Trademark Office*